(12) United States Patent
Giraud

(10) Patent No.: US 8,180,046 B2
(45) Date of Patent: *May 15, 2012

(54) METHOD FOR MAKING SECURE AN ELECTRONIC ENTITY WITH ENCRYPTED ACCESS

(75) Inventor: Christophe Giraud, Paris (FR)

(73) Assignee: Oberthur Technologies, Levallois-Perret (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/852,637

(22) Filed: Aug. 9, 2010

(65) Prior Publication Data

US 2010/0322421 A1 Dec. 23, 2010

Related U.S. Application Data

(63) Continuation of application No. 10/510,284, filed as application No. PCT/FR03/01032 on Apr. 2, 2003, now Pat. No. 7,796,750.

(30) Foreign Application Priority Data

Apr. 8, 2002 (FR) ...................................... 02 04341

(51) Int. Cl.
*H04L 9/28* (2006.01)
*H04K 1/00* (2006.01)
(52) U.S. Cl. ......................................................... 380/29
(58) Field of Classification Search .................. None
See application file for complete search history.

(56) References Cited

U.S. PATENT DOCUMENTS

| | | | |
|---|---|---|---|
| 6,108,419 A | 8/2000 | Barker et al. | |
| 6,199,162 B1 | 3/2001 | Luyster | |
| 6,219,420 B1 | 4/2001 | Hardy et al. | |
| 6,751,319 B2 | 6/2004 | Luyster | |
| 6,961,725 B2 * | 11/2005 | Yuan et al. | 707/694 |
| 6,985,581 B1 | 1/2006 | Callum | |
| 7,190,791 B2 * | 3/2007 | Boren et al. | 380/45 |
| 7,295,671 B2 | 11/2007 | Snell | |
| 7,340,053 B2 | 3/2008 | Tanaka et al. | |
| 7,796,750 B2 * | 9/2010 | Giraud | 380/29 |
| 2001/0038693 A1 | 11/2001 | Luyster | |
| 2007/0180541 A1 | 8/2007 | Shu et al. | |
| 2007/0189536 A1 | 8/2007 | Gammel et al. | |
| 2008/0298642 A1 * | 12/2008 | Meenen | 382/115 |
| 2010/0205506 A1 * | 8/2010 | Hara | 714/755 |

(Continued)

FOREIGN PATENT DOCUMENTS

JP 10-154976 A 6/1998

(Continued)

OTHER PUBLICATIONS

Japanese Office Action, dated Jun. 23, 2009.

(Continued)

*Primary Examiner* — Christopher Revak
(74) *Attorney, Agent, or Firm* — Young & Thompson

(57) ABSTRACT

A method for protecting an electronic entity with encrypted access, against DFA (Differential Fault Analysis) attacks which includes: storing the result of a selected step (Rm, Kn) of an iterative process forming part of the cryptographic algorithm and in performing once more at least part of the steps of the iterative process up to a new computation of a result corresponding to the one which has been stored, comparing the two results and denying distribution of an encrypted message (MC) if they are different.

14 Claims, 3 Drawing Sheets

U.S. PATENT DOCUMENTS

2010/0254530 A1* 10/2010 Wang et al. ............ 380/28

FOREIGN PATENT DOCUMENTS

WO 98 52319 11/1998
WO 03 024017 3/2003

OTHER PUBLICATIONS

Eiji Okamoto, "Introduction to Cryptograph Theory", Kyoritsu Shuppan K.K., Feb. 25, 1993, pp. 33-51.

Shiho Moriai, "Fault-Based Attacks of Block Ciphers", The 1997 Symposium on Cryptography and Information Security, The Institute of Electronics, Information, and Communication Engineers, Jan. 30, 1997.

Ramesh Karri et al., "Fault-Based Side-Channel Cryptanalysis Tolerant Rijndael Symmetric Block Cipher Architecture", Proceedings of the 2001 IEEE International Symposium on Defect and Fault Tolerance in VLSI Systems (DFT'01) 083-6722/01, 2001; XP-055008477.

* cited by examiner

METHOD FOR MAKING SECURE AN ELECTRONIC ENTITY WITH ENCRYPTED ACCESS

CROSS REFERENCE TO RELATED APPLICATIONS

This application is a continuation of application Ser. No. 10/510,284 now U.S. Pat. No. 7,796,750 filed on Nov. 9, 2005, which is the 35 U.S.C. §371 national stage of International PCT/FR03/01032 filed on Apr. 2, 2003, which claims priority to French Application No. 02/04341 filed on Apr. 8, 2002. The entire contents of each of the above-identified applications are hereby incorporated by reference.

BACKGROUND OF THE INVENTION

1. Field of the Invention

The invention relates to a method for making secure an electronic entity with encrypted access, such as a microcircuit card, for example, the improvement being more particularly aimed at detecting differential fault analysis (DFA) attacks. The invention aims in particular to make prior art algorithms such as the AES and DES algorithms secure.

2. Description of Related Art

Certain electronic entities with encrypted access, in particular microcircuit cards, are vulnerable to DFA attacks that disrupt the execution of the cryptographic algorithm to change an intermediate result, processing the resulting difference between the message encrypted normally and the message encrypted with an error, and deducing the secret key of the electronic entity from this information. These errors are very easy to produce in a microcircuit card by operating on the external environment, for example by causing a voltage spike, exposing the card to a light flash (in particular using a laser beam), causing the frequency of the external clock to vary suddenly, etc.

The most widely used algorithm includes the data encryption standard (DES) algorithm and, the most widely used of all, the advanced encryption standard (AES) algorithm. The AES and DES algorithms have the common feature of applying a succession of groups of operations known as "rounds" to an input message under the control of a series of respective sub-keys successively produced from an initial secret key specific to the electronic entity concerned. It is this initial key (denoted K hereinafter) that the fraudster attempts to reconstitute. A portion of the algorithm is devoted to generating sub-keys using a process of key extension by a function F that in the case of the AES algorithm is a non-linear function. The function is applied to said initial key, then to the result of application of said function, and so on. The sub-keys are generated from this succession of intermediate results obtained from the initial key K.

Until now, DFA attacks have been considered to be unusable in practice against the AES algorithm. However, work on which the invention is based has shown that a triple DFA attack synchronized with certain applications of the function F and the beginning of the final "round" discloses all the bytes of the last sub-key when said input key K is coded on 128 bits, which is currently the case for most systems in which the AES algorithm is used. The entry key may be recovered from this information.

BRIEF SUMMARY OF THE INVENTION

The invention offers a simple and effective barrier to this type of attack. The invention provides a method of making an electronic entity with encrypted access secure when said electronic entity comprises means for executing a cryptographic algorithm consisting in applying to an input message a succession of groups of operations known as "rounds" involving a series of respective sub-keys produced successively by an iterative process starting from an initial key K, which method is characterized in that it consists in storing a result of an intermediate step of said iterative process, repeating at least some of the steps of said iterative process until a result is calculated corresponding to the result that has been stored, comparing said stored result to the corresponding recalculated result, and prohibiting the broadcasting of an encrypted message resulting from the application of said algorithm if said two results are different.

If an error caused by a DFA attack occurs during the iterative process of generating the sub-keys, then the stored result and the corresponding recalculated result are necessarily different because it is impossible in practice to reproduce the same "error" twice in a row.

For example, a stored result, referred to as an intermediate result, may be one of the steps of the key diversification process consisting in applying a non-linear function F to the result of the preceding analogous step. It is also possible to store one of the sub-keys, for example the last sub-key, and to recalculate that sub-key from an earlier step of said iterative process.

BRIEF DESCRIPTION OF THE SEVERAL VIEWS OF THE DRAWINGS

The invention will be better understood and other advantages thereof will become more clearly apparent in the light of the following description, which is given by way of example only and with reference to the appended drawings, in which.

DETAILED DESCRIPTION OF THE INVENTION

Figure 1:
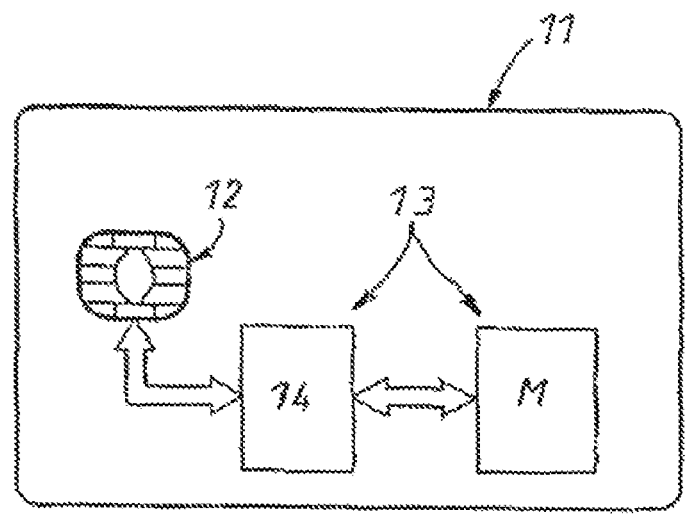
FIG. 1 is a block diagram of an electronic entity such as a microcircuit card adapted to implement the method of the invention.

FIG. 1 shows an electronic entity 11, in this case a microcircuit card with its essential components, namely a set of metal contact areas 12 for connecting the microcircuit 13 contained in the card to a card reader, server or the like with which said microcircuit card is able to exchange information after an authentication phase using a prior art secret key algorithm, for example the AES algorithm or the DES algorithm. The microcircuit 13 conventionally comprises a microprocessor 14, some ports of which are connected to the contact areas, and a memory M coupled to the microprocessor. When the card is coupled to an external unit to execute a given function (financial transaction, access to a telephone or telematic service, access control, etc.), an authentication phase is executed in the card. This process is programmed in the microcircuit 13 and a portion of the memory M is dedicated to it.

Figure 2:
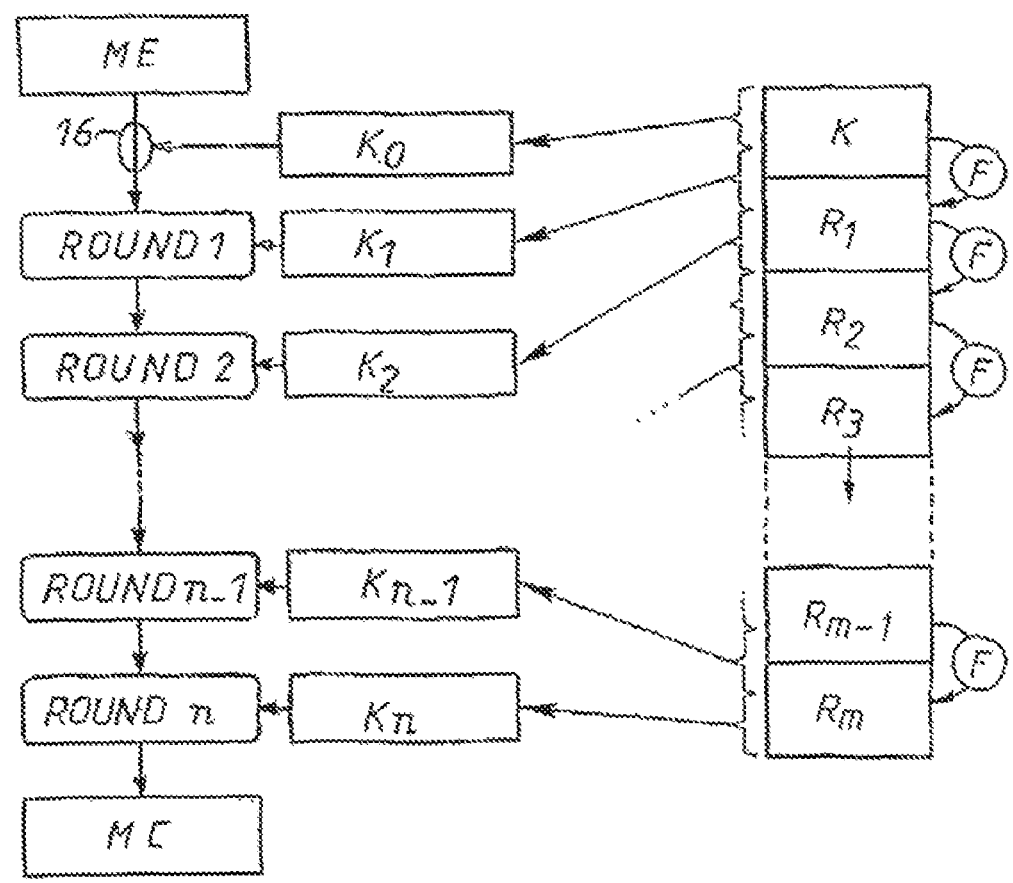
FIG. 2 is a flowchart for the AES algorithm.

For example, the authentication phase uses the AES algorithm, which is described with reference to FIG. 2. The AES algorithm operates on an input message ME transmitted in clear by the external unit to which the electronic entity 11 is coupled. The entity 11 also holds a stored secret key K and the algorithm transforms the message ME to obtain an encrypted message MC after a certain number of transformations effected with a certain number of sub-keys $K_0, K_1, K_2, \ldots K_{n-1}, K_n$. A non-linear function F programmed in the electronic entity is applied successively to the key K, then to the result $R_1$ of the transformation of the key K by the function F, then to the result $R_2$ of the transformation of the result $R_1$ by the same function F, and so on. The various sub-keys $K_0 \ldots K_n$ are extracted from this process of extension of the key K by the function F. To be more precise, the key K may be a word of 128 bits, 192 bits or 256 bits. This is known in the art. The input message ME is a word of 128 bits. All combinations are possible and the person skilled in the art chooses the combination that represents the best compromise, given the context, between speed of execution and the required level of security. At present, however, most AES algorithms actually deployed use a key K of 128 bits. The sub-keys $K_0 \ldots K_n$ must be in the same format as the input message. This is why each sub-key is created from one or two successive results produced during the process of extension of the key by the function F. In the present example, the key K is coded on 192 bits. Consequently, the sub-key $K_0$ is extracted from the first two thirds of the key K, the sub-key $K_1$ is extracted from the other third of the key K and from the first third of the intermediate result $R_1$ of the first transformation of this key by the function F, the sub-key $K_2$ is extracted from the last two thirds of the intermediate result $R_1$, and so on up to and including the production of the final sub-key $K_n$.

The input message ME is processed by the following operations. Said input message ME is combined with the sub-key $K_0$ by an exclusive-OR function 16. The result of this operation is subjected to a group of operations (here called ROUND 1) involving the sub-key $K_1$. The result is then subjected to a group of operations (ROUND 2) involving the sub-key $K_2$, and this continues up to $ROUND_{n-1}$, known as the final ROUND, involving the sub-key $K_{n-1}$. All the "ROUNDS" from 1 to n−1 comprise four transformations. A final ROUND, denoted $ROUND_n$, involving the sub-key $K_n$ comprises only three transformations. The result of this final round is an encrypted message MC that is sent to the external environment.

The invention is based on the following considerations. It has been shown that, if it is possible to provoke such disruptions at precise moments in the execution of the AES algorithm described above, it is possible to retrieve all the bytes of a sub-key, and more particularly (in this example) the final sub-key $K_n$, in the following manner:

- if the disruption is provoked at the moment of final application of the function F, information is retrieved on the penultimate extension of the key by the function F, that is to say the last four bytes of the penultimate result $R_{m-1}$;
- if a disruption is also provoked at the moment of execution of the penultimate extension of the key by the function F, the adjoining four bytes of $R_{m-1}$ may be retrieved;
- if a disruption is provoked at the beginning of the final round ($ROUND_{n-1}$), 8 bytes are retrieved from the last extension of the key by the function F, that is to say $R_m$; these bytes belong to the sub-key $K_n$;
- processing the above results retrieves six more bytes distributed in the final extension of the key $R_m$ by the function F; these bytes also belong to the sub-key $K_n$.

Investigating all possibilities until the last two bytes of the sub-key $K_n$ are retrieved may be envisaged. Consequently, if the key K were coded on 128 bits, it would undoubtedly be retrieved by a single implementation of the attack described above. In most AES algorithms currently deployed, the key K is coded on 128 bits and there is no difference between the intermediate results $R_1, R_2 \ldots R_m$ and the sub-keys $K_1, K_2 \ldots K_n$ (in this case, n=m), as each sub-key consists of the whole of a corresponding intermediate result $R_i$. In the present example, however, the key K is coded on 192 bits and the attack described in outline above is not able to retrieve the key since the result $R_m$ is not known completely. Thus it is not possible to "work back" to the key K from this incompletely known result. Nevertheless, security has been seriously weakened as partial information is available on the key, which makes other attacks known in the art (for example DPA attacks) more effective.

Figure 3:
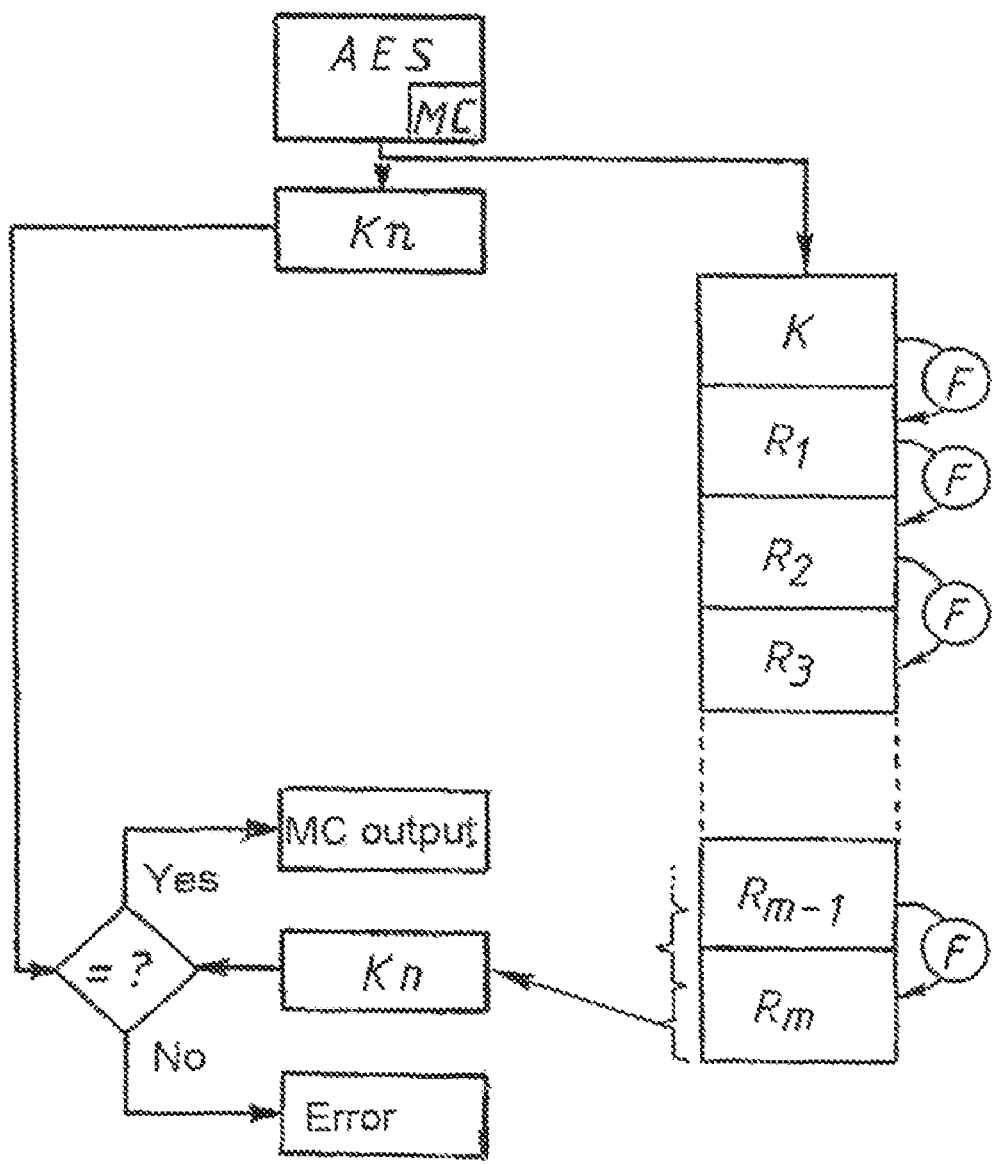
FIG. 3 is a flowchart for complementary implementation of the invention during execution of the AES algorithm.

Be this as it may, the barrier to this type of attack consists in storing an intermediate result $R_i$, for example the result $R_m$, or a sub-key, for example the final sub-key $K_n$, and repeating at least some of the steps of producing the succession of said sub-keys, i.e. essentially the process of extension of the key by the function F, until a result is calculated that corresponds to the result that has been stored. From this moment, intermediate results or sub-keys are available that must be identical if the electronic entity has not been subject to any DFA attack. It suffices to compare the stored result or sub-key to the corresponding recalculated result or sub-key and to prohibit broadcasting of the encrypted message MC resulting from the final round if they are different. This is shown in FIG. 3 in which (in one embodiment of the invention) the AES algorithm is complemented by repeating all the steps producing the succession of sub-keys, and more particularly the process of extending the key K. In this example, the AES algorithm described with reference to FIG. 2 is executed a first time, the result of which is an encrypted message MC. The final sub-key $K_n$ is stored. The whole process of extension of the key by the function F is then repeated starting from the secret key K of the entity. This yields a new value of K. The value previously stored and the new value are compared (to test for equality). If the two values are equal, issuing the message MC is authorized. If the two values do not coincide, the message MC is not forwarded to the external environment and an error message may be sent.

In the example that has just been described, the whole of the key extension process is repeated until the final sub-key $K_n$ is calculated again. As indicated above, any intermediate result $R_i$ or sub-key may be stored and at least some of the steps of producing the succession of sub-keys repeated until an intermediate result or sub-key is calculated corresponding to that which has been stored. If the whole of the cycle of extension of the key by the function F is not repeated, it is generally advantageous to repeat at least a final portion of the steps of producing the succession of said sub-keys, in other words, more particularly, a final portion of the process of extension of a key by the function F, until the final intermediate result $R_m$ or the final sub-key is calculated a second time.

If the whole of the iterative key extension process is not repeated, starting from the key K, it is obviously necessary to store the intermediate result or sub-key from which the process is repeated.

Figure 4:
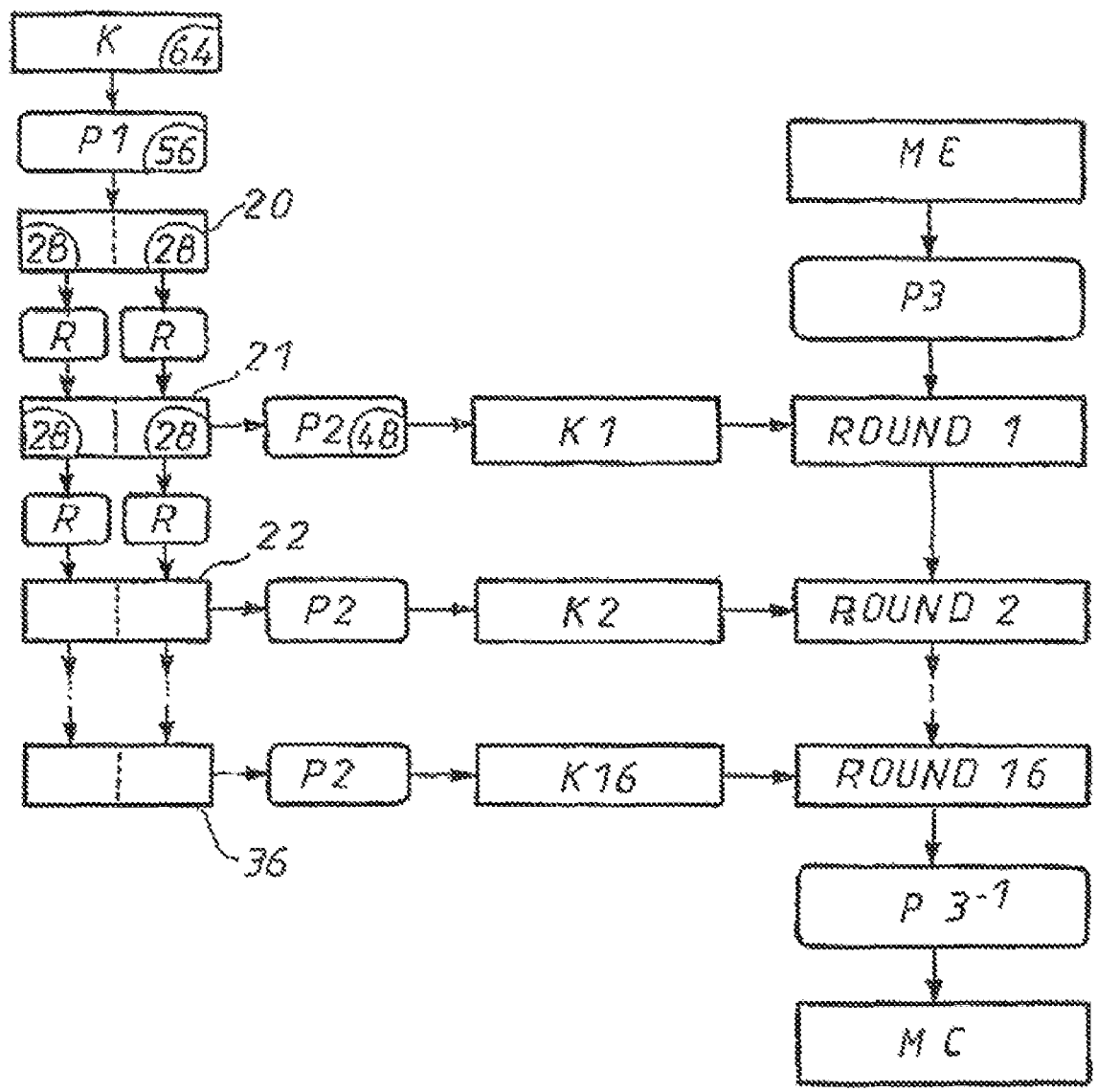
FIG. 4 is a flowchart for the DES algorithm, to which the invention may also be applied.

The invention is not limited to making the AES algorithm secure. For example, FIG. 4 depicts the equally well known DES algorithm. Briefly, in this algorithm, the process of extending the key K is as follows. The key K (64 bits) is subjected to a permutation P1 of the bits and reduced to 56 bits. The result is a word 20 divided into two portions each of 28 bits. Each portion is subjected to a permutation R (circular rotation of the bits) of one or two bits, as appropriate. The two results are combined to form a new word 21 of 56 bits that is subjected to a new permutation P2 and concatenated to 48 bits to yield a sub-key $K_1$. Also, the 56-bit word 21 is processed by means of two circular rotations R to yield a new word 22 which is again subjected to the permutation P2 to generate a sub-key K2, and so on up to and including a sub-key K16.

Moreover, the 64-bit input message ME is subjected to the following transformations. It is first subjected to a permutation P3 of the bits and the result is subjected to functions constituting ROUND 1 involving sub-key K1. Other successive rounds are then implemented involving corresponding other sub-keys, up to and including sub-key K16, and the result of the final round is subjected to an inverse permutation P3⁻. The result of this inverse permutation is the encrypted message MC to be sent.

Clearly, the general structure of the DES algorithm outlined above lends itself well to use of the invention. For example, it suffices to store the sub-key K16 and to repeat some or all of the process of diversification of the key K consisting of the permutation P1 and the rotations R. The test may even be applied to the final intermediate result (word 36) prior to the final permutation P2. In this case it is the final result that is stored and not the sub-key K16.

Of course, the invention relates to any other electronic entity, in particular any microcircuit card, comprising means for implementing the method described hereinabove.

What is claimed is:

1. A method of executing a cryptographic algorithm by an electronic entity, said method including processing an initial message, said processing including applying at least one sub-key, said method including the following steps:
   producing said sub-key by applying a process;
   storing said sub-key in said electronic entity;
   repeating at least a final portion of the process, thus obtaining a result corresponding to the stored sub-key;
   comparing the value of the result to the value of the stored sub-key; and
   prohibiting the broadcasting of a message resulting from the application of said algorithm if said two values are different.

2. A method according to claim 1, wherein said process is an iterative process applied to an initial key.

3. A method according to claim 1, wherein said algorithm includes applying a plurality of operations to the initial message and wherein one of said operations includes applying said sub-key.

4. A method according to claim 1, wherein the algorithm is an AES algorithm.

5. A method according to claim 1, wherein the algorithm is a DES algorithm.

6. A method according to claim 1, wherein the electronic entity is a microcircuit card.

7. A method according to claim 1, wherein the step of repeating comprises repeating said process.

8. An electronic entity comprising means for implementing the method according to claim 1.

9. A microcircuit card comprising means for implementing the method according to claim 1.

10. A method according to claim 2, wherein the step of repeating comprises repeating said process.

11. A method according to claim 3, wherein the step of repeating comprises repeating said process.

12. A method according to claim 4, wherein the step of repeating comprises repeating said process.

13. A method according to claim 5, wherein the step of repeating comprises repeating said process.

14. A method according to claim 6, wherein the step of repeating comprises repeating said process.

* * * * *